Nov. 4, 1947.　　　　M. A. CROSBY　　　　2,429,994
WIRE COVERED MOLDED COG BELT
Filed March 8, 1943
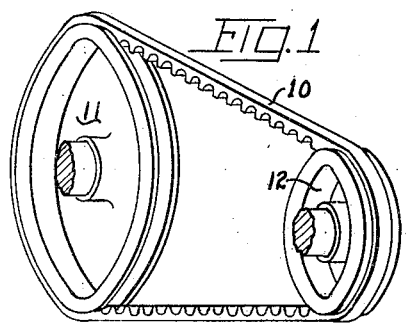
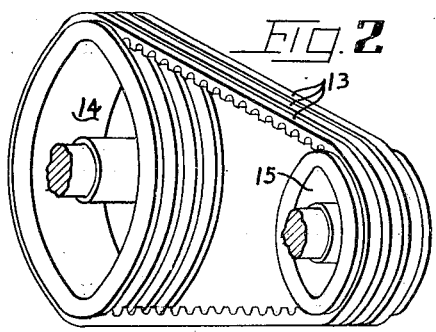
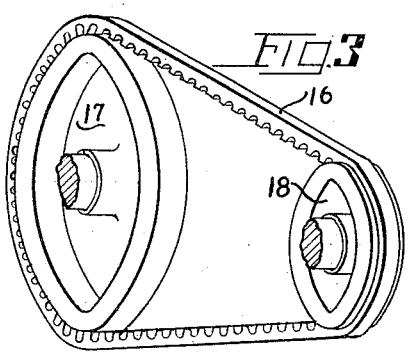
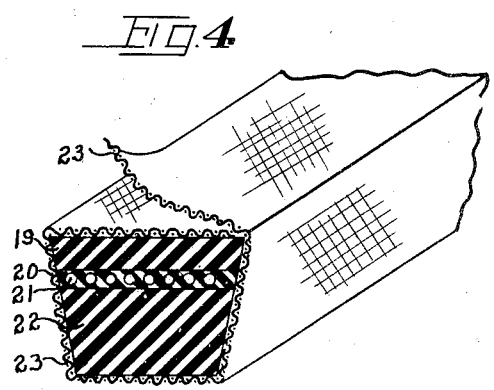
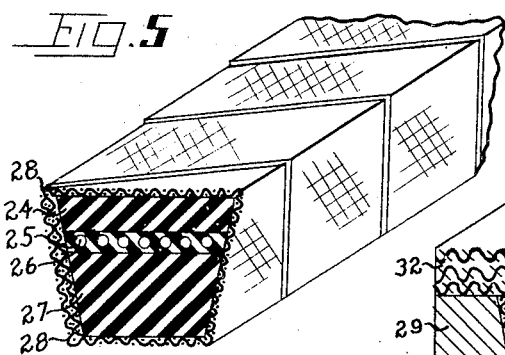
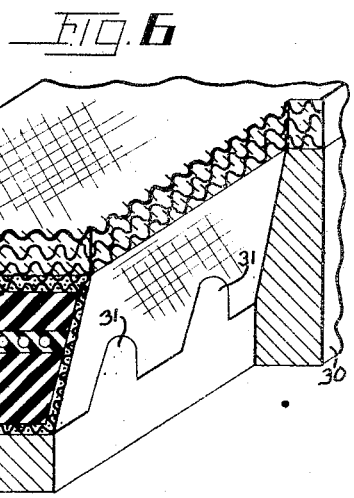
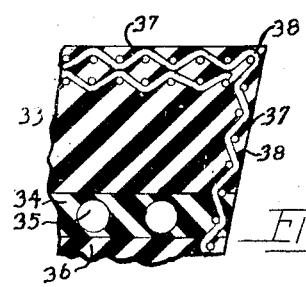
INVENTOR
MELVIN A. CROSBY
BY
ATTORNEYS Patented Nov. 4, 1947

2,429,994

UNITED STATES PATENT OFFICE 2,429,994

WIRE COVERED MOLDED COG BELT

Melvin A. Crosby, Dayton, Ohio, assignor to The Dayton Rubber Company, a corporation of Ohio Application March 8, 1943, Serial No. 478,434

7 Claims. (Cl. 74—233)

This invention relates to belts, and more particularly deals with a belt of the V-type having a woven metal cloth wrapper adjacent its outer surfaces.

The improved belt which is the subject matter of this invention is characterized by high resistance to frictional abrasion and long service life, and may be manufactured with substantially smooth top and bottom surfaces as described and claimed in my application Serial No. 478,432, filed coincident herewith or with alternate cogs and grooves along the inner or outer surface or along both of these surfaces as described and claimed in the present application.

The nature of the present invention will be fully understood from the following description taken in connection with the annexed drawing wherein:

Fig. 1 illustrates the manner in which the belt of the present invention may be used in a single belt V-to-V drive;

Fig. 2 illustrates the manner in which the belt of the present invention may be used in a multiple belt V-to-V drive;

Fig. 3 illustrates the manner in which the belt of the present invention may be used in a single belt V-to-flat drive;

Fig. 4 is a perspective view illustrating the built-up body of the belt of the present invention before curing and showing one manner of applying the metal fabric wrapper;

Fig. 5 is a perspective view illustrating the built-up body of the belt of the present invention before curing and showing another manner of applying the metal fabric wrapper;

Fig. 6 is a perspective view partly broken away illustrating the manner in which the built-up belt body of Fig. 4 or Fig. 5 is molded to produce the belt of the present invention; and Fig. 7 is a fragmentary cross sectional view illustrating the relative position of the metal fabric wrapper with respect to the other portions of the belt.

Referring to the drawing in detail, 10 is a V-belt of the present invention driving the V-pulleys 11 and 12 in a typical single belt V-to-V drive; in Fig. 2, 13 represents a plurality of belts of the present invention driving the V-pulleys 14 and 15 in a typical multi-belt V-to-V drive; and in Fig. 3, 16 represents a belt of the present invention driving the flat pulley 17 and the V-pulley 18 in a typical single belt V-to-flat drive.

In Fig. 4, 19 represents the tension section of the belt, 20 represents the neutral axis section comprising cords 21, 22 represents the compression section of the belt, and 23 represents the metal fabric wrapper which surrounds the built-up body of the belt.

In Fig. 5, 24 represents the tension section of the belt, 25 represents the neutral axis section including cords 26, 27 represents the compression section of the belt, and 28 represents the metal cloth wrapper which surrounds the built-up body of the belt.

In Fig. 6, 29 represents one section of the mold and 30 represents the other section of the mold wherein the built-up belt body of Fig. 4 or Fig. 5 may be molded to produce the wire wrapped cog belt which is the subject matter of this invention. It will be noted that the mold half 29 is provided with a plurality of raised ribs 31. These ribs are adapted to form alternate grooves and cogs on the underside of the belt in the course of the curing or vulcanizing operation.

The belt of the present invention may be manufactured, for example, by building up a belt body of superposed layers adapted to form tension, neutral axis and compression sections, cutting said built-up body to produce individual belts, wrapping the cut belts with woven metal fabric in a manner adapted to provide a longitudinal seam with respect to the longitudinal axis of the belt as in Fig. 4 or spirally as in Fig. 5, and then molding the wrapped belt body under the influence of heat and pressure in a suitable mold.

The molding may be carried out as illustrated in Fig. 6 by placing the wrapped belt in the ribbed half 29 of the mold, bringing in association therewith the separable mold half 30, wrapping a plurality of wet fabric layers 32 over the mold and belt therein, and placing the mold in a vulcanizer. The heat in the vulcanizer will drive off water from the wetted wrapper 32 around the mold and will cause it to shrink thus exerting pressure on the belt body within the mold and causing it to conform with the general outline thereof.

The pressure exerted in the molding operation, together with the heat applied to the belt body within the mold, will cause a portion of the rubber composition comprising the compression, neutral axis and tension sections of the belt to exude or squeeze through the meshes in the woven metal fabric wrapper on the belt, and the finished belt, as illustrated in Fig. 7, will consist of a tension section 33, a neutral axis section 34 including a plurality of cords 35, a compression section 36, a woven metal cloth wrapper 37, and an outer coating of rubber composition 38.

The cords in the neutral axis section may be of fibrous textile material such as cotton or rayon or preferably of fine metal wires twisted or braided into a cable of suitable diameter depending on the nature of the belt and of the service for which it is intended.

The tension, neutral axis and compression sections may be of rubber composition as illustrated in the drawing and such rubber composition may include reinforcing means comprising fine textile fibers which lie parallel to each other and which may be caused to lie transverse of the longitudinal axis of the belt to impart to it lateral incompressibility without limiting its ability to flex or arch in passing over pulleys of small diameter. If desired, rubberized fabric layers may be included in the tension section of the belt to impart to its greater strength.

The belt of the present invention may be used for V-to-flat drives just as well as for V-to-V drives, and this feature is illustrated in the drawing. The alternate cogs and grooves on its under side or surface give it extraordinary flexibility and make it possible to run the belt at high speeds without overheating it. Overheating is due primarily to internal stresses generated in the belt as it passes at high lineal velocities over pulleys of small diameter and such overheating proves highly detrimental and causes a substantial reduction in the service life of the belt. Therefore, because of the extraordinary flexibility of the belt of the present invention due to its cog surface, it is a cool running belt and one characterized by long service life under difficult conditions.

The belt of the present invention exhibits high resistance to frictional abrasion. The frictional engagement between the belt and the pulley is actually between the thin coating of rubber composition 38 (see Fig. 7) on the surface of the belt and the metal face of the pulley, and as the thin coating of rubber composition 38 is abraded away, the woven metal cloth wrapper 37 (see Fig. 7) will be exposed and will come into contact with the surface of the pulley; however, a sufficient amount of rubber will remain exposed at the points between the individual strands of wire that frictional engagement between the rubber of the belt and the metal of the pulley will remain although the rate of wear will be substantially reduced due to the abrasion resistance of the metal in the woven metal cloth wrapper 18.

There has been described and illustrated in the drawing a belt in which the wire wrapper is applied by wrapping the built-up body of the individual belt with woven wire cloth. The belts of the present invention may be manufactured and substantially the same article obtained by using a tubular member of woven wire cloth as illustrated in my copending application Serial No. 478,432 filed coincident herewith. As described in that application, superposed layers adapted to comprise tension, neutral axis and compression sections of the belt are introduced or inserted in a tubular member of woven wire cloth and the resulting article is then subjected to molding substantially as hereinbefore described.

It will be understood that it is advantageous to have the wires in such a tubular member or in the woven metal cloth wrapper previously referred to at a bias with respect to the body of the belt in order thereby to facilitate the flexing or bending of the finished belt as it passes over pulleys or sheaves of small diameter.

It will be further understood that while there have been illustrated in the drawing and herein described certain embodiments of the present invention, it is not intended thereby to have this invention limited to or circumscribed by the specific details of construction, arrangement of parts, procedures, or products herein described or illustrated in the drawing in view of the fact that the present invention may be modified according to individual preference and conditions without departing from the spirit of this disclosure and the scope of the appended claims.

I claim:

1. As a new article of manufacture, a cog V-type belt made of rubber composition comprising tension, neutral axis and compression sections and having a cover of woven metal cloth all around said belt, the wires in said woven metal cloth cover being at a bias with respect to the longitudinal axis of the belt, said belt having spaced cogs along its underside lying transverse of the longitudinal axis of the belt, the woven metal being between said cogs.

2. As a new article of manufacture, a V-type belt comprising a cover of woven wire cloth encasing superposed layers of rubber composition comprising tension, neutral axis and compression sections, said belt having spaced cogs along its underside lying transverse of the longitudinal axis of the belt, said woven wire cloth cover running over said cogs and the grooves therebetween.

3. As a new article of manufacture, a V-type belt comprising a cover of woven wire cloth encasing superposed layers of rubber composition comprising tension, neutral axis and compression sections, said belt having spaced cogs along its underside lying transverse of the longitudinal axis of the belt, said woven wire cloth cover running over said cogs and the grooves therebetween, and said neutral axis section comprising a plurality of cords land parallel to each other and along the longitudinal axis of the belt.

4. As a new article of manufacture, a V-type belt comprising an outer cover of woven metal cloth, superposed layers of rubber composition comprising tension, neutral axis and compression sections, and a thin coating of rubber composition over said outer cover of woven metal cloth, said belt having a plurality of spaced cogs along its inner side, said cover of woven metal cloth running all around said belt and over said cogs and the grooves therebetween.

5. As a new article of manufacture, a V-type belt comprising an outer cover of woven metal cloth, superposed layers of rubber composition comprising tension, neutral axis and compression sections, and a thin coating of rubber composition over said outer cover of woven metal cloth, said belt having a plurality of spaced cogs along its inner side, said cover of woven metal cloth running all around said belt and over said cogs and the grooves therebetween, and said neutral axis section comprising a plurality of cords lying parallel to each other and along the longitudinal axis of the belt.

6. As a new article of manufacture, a cog V-type belt made of rubber composition comprising tension, neutral axis and compression sections and having a spirally wound cover of woven metal all around said belt, said rubber composition penetrating and filling the interstices of said metal cover so that the outer surface of said belt consists alternately of metal and rubber parts, said belt having spaced cogs along its underside lying transverse of the longitudinal axis of the belt, the woven metal being between said cogs.

7. As a new article of manufacture, a V-type belt comprising a cover of woven wire cloth encasing superposed layers of rubber composition comprising tension, neutral axis and compression sections, said belt having spaced cogs along its underside lying transverse of the longitudinal axis of the belt, said woven wire cloth cover running over said cogs and the grooves therebetween, and said rubber composition penetrating and filling the interstices of said wire cloth so that the outer surface of said belt consists alternately of metal and rubber parts.

MELVIN A. CROSBY.

REFERENCES CITED

The following references are of record in the file of this patent:

UNITED STATES PATENTS

| Number | Name | Date |
|---|---|---|
| 1,920,525 | Roderwald | Aug. 1, 1933 |
| 2,199,529 | Shackleford | May 7, 1940 |
| 398,431 | Midgley | Feb. 26, 1889 |
| 2,179,691 | Freedlander | Nov. 14, 1939 |
| 2,167,942 | Freedlander | Aug. 1, 1939 |
| 2,016,973 | Pistilli | Oct. 8, 1935 |
| 1,442,924 | Carlisle | Jan. 23, 1923 |
| 2,065,180 | Freedlander | Dec. 22, 1936 |
| 782,479 | Becker | Feb. 14, 1905 |
| 1,970,509 | De Wein | Aug. 10, 1934 |
| 2,167,384 | Freedlander | July 25, 1939 |